No. 756,142. Patented March 29, 1904.

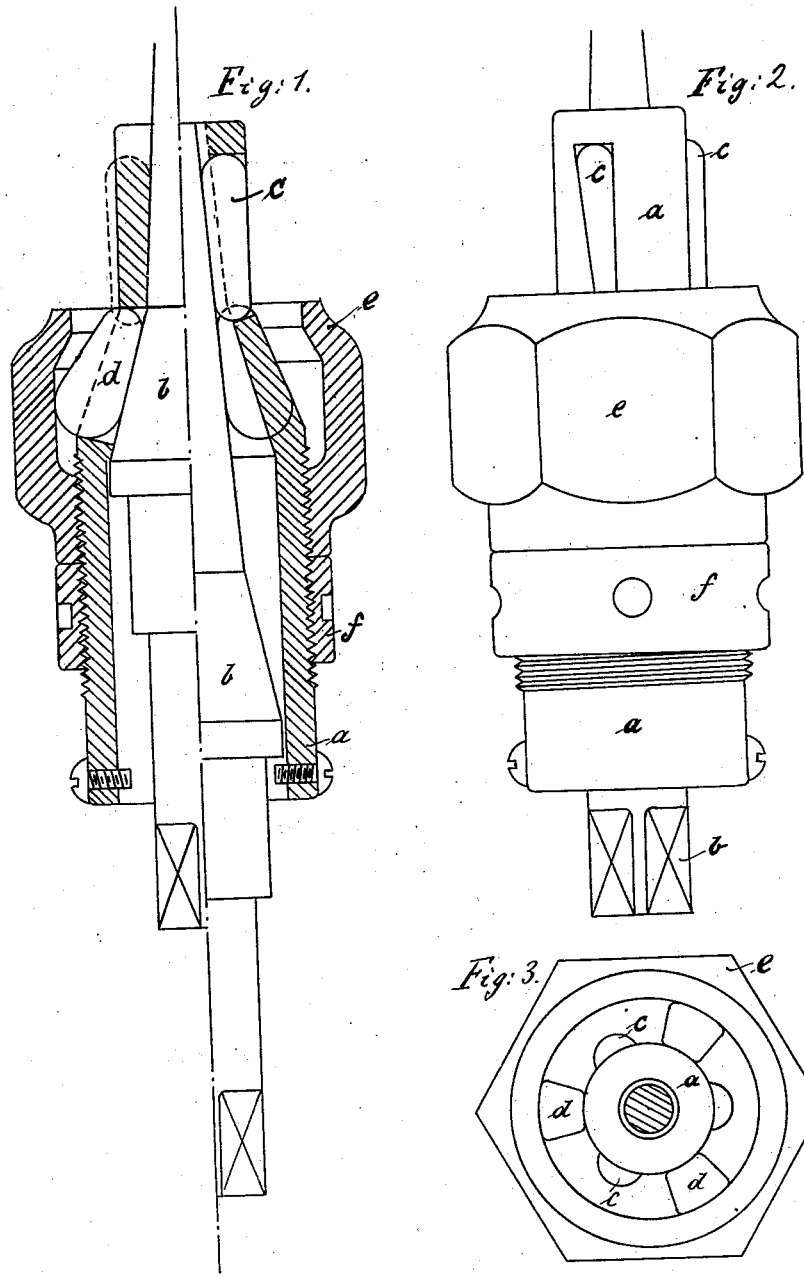

UNITED STATES PATENT OFFICE.

AUGUST RESCHKE, OF KIEL, GERMANY.

EXPANDING AND SPREADING TOOL.

SPECIFICATION forming part of Letters Patent No. 756,142, dated March 29, 1904.

Application filed August 15, 1903. Serial No. 169,635. (No model.)

*To all whom it may concern:*

Be it known that I, AUGUST RESCHKE, a subject of the Emperor of Germany, residing at Schrevenbrücke 10, Kiel, Germany, have invented certain new and useful Improvements in Expanding and Spreading Tools, of which the following is a specification.

This invention is adapted for expanding the tubes in the wrought-iron headers used in tube-boilers and for turning over at the same time the ends into the shape of a flange.

The object of the invention is a tool which comprises a double-tapered rotating mandrel and a series of expanding and flanging rollers which lie adjacent to the said mandrel so that the axes of the expanding-rollers converge to a common point and that the axes of the flanging-rollers converge also to a common point.

In the accompanying drawings, forming part of this specification, Figure 1 shows in longitudinal sections the improved tool in an advanced position and in a withdrawn position, divided by a middle line. Fig. 2 is a side elevation of the tool, and Fig. 3 shows the same in plan view.

In a suitable casing $a$, supporting the rollers, the mandrel $b$ freely revolves, having at its end a square head, so as to admit of the application of force to turn it. The front part of this mandrel is a cone of a slight taper designed to act on the expanding-rollers $c$. This cone is followed by another cone of stronger taper, which is to operate upon the flanging-rollers $d$. These rollers are lodged in the casing $a$ in suitable cavities; but the latter are arranged in a line diverging to the axis of the tool and inclined to a plane through said axis, as clearly shown in the drawings, so that by the revolution of the mandrel the friction produces a tendency of pressing the mandrel forwardly, and that for this reason the expanding and flanging is greatly facilitated.

The casing $a$ is provided with a screw cap or nut $e$ and with an adjusting-ring $f$. By the arrangement of these two parts the following object is attained:

In expanding the tubes they yield at the beginning of the operation; but by screwing the nut $e$ tightly against the wall of the boiler this yielding is prevented. After a small number of revolutions of the mandrel $b$ the tubes, however, are sufficiently tightened in the wall that displacement will not occur any more. Then the nut is unscrewed and the ring $f$ serves as a mark for the duration of the operation, since the nut $e$ at the end of the operation screws itself against the ring $f$.

Having thus fully described my invention, what I claim, and desire to secure by Letters Patent, is—

Expanding and flanging tools for tubes comprising a double-tapered mandrel in combination with a set of the expanding-rollers $c$ and with a set of flanging-rollers $d$, the former adapted to be acted upon by the cone of less taper and the latter to be acted upon by the truncated cone of stronger taper said rollers being lodged in cavities of the casing their axes being inclined not to intersect with the axis of the tool, and comprising a screw cap or nut $e$ and an adjusting-ring $f$ adapted to be screwed upon the outer threaded surface of the casing, substantially as described and for the purpose set forth.

In testimony whereof I affix my signature.

AUGUST RESCHKE.

In presence of—
 WILLY MIOWACH,
 JULIUS RÖPKE.